United States Patent
Peng et al.

[11] Patent Number: 5,733,114
[45] Date of Patent: Mar. 31, 1998

[54] DETACHABLE TORCH FOR WET OXIDATION

[75] Inventors: Jyh-Wen Peng; Chang-Cheng Chen; Meng-Haw Huang; Matthew Luh, all of Hsinchu, Taiwan

[73] Assignee: Mosel Vitelic, Inc., Hsinchu, Taiwan

[21] Appl. No.: 789,811

[22] Filed: Jan. 28, 1997

[51] Int. Cl.$^6$ .................................................. F23D 11/44
[52] U.S. Cl. ........................... 431/208; 431/166; 431/154
[58] Field of Search ................................ 431/208, 166, 431/154

[56] References Cited

U.S. PATENT DOCUMENTS

| 3,090,420 | 5/1963 | Sacco | 431/208 |
| 3,460,911 | 8/1969 | Krejci et al. | 431/154 |
| 3,497,324 | 2/1970 | Loewen | 431/154 |
| 5,186,621 | 2/1993 | Pennington | 431/154 |

*Primary Examiner*—Carroll B. Dority
*Attorney, Agent, or Firm*—Pennie & Edmonds LLP

[57] ABSTRACT

The present invention discloses a detachable torch for providing heat source for a horizontal quartz tube in the process of wet oxygen. The invention includes a combustion chamber, a heating pipe, an oxygen inlet pipe, a hydrogen inlet pipe, and a coupling device. The hydrogen inlet pipe is coupled to the heating pipe via a coupling device. The removal of the coupling device departs the hydrogen inlet pipe from the heating pipe. Thus, when the mouth of the hydrogen inlet pipe gets brittle due to tempering and needs replacement, we only need to replace the hydrogen inlet pipe instead of the entire torch.

10 Claims, 5 Drawing Sheets

DETACHABLE TORCH FOR WET OXIDATION

BACKGROUND OF THE INVENTION

1. Field of the Invention

The present invention relates to an apparatus used for the processing of silicon wafers for wet oxidation. In particular, the invention relates to a new torch which contains a detachable hydrogen inlet pipe for increasing the lifetime of the torch and provides improved performance for silicon wafer processing.

2. Description of the Prior Art

In wafer fabrication processes, wafers in boats are treated in horizontal tubular chambers encircled with electrical heating elements. In the process of wet oxidation, a typical horizontal reactor flows steam into the reactor tube 101 through the heat zone 102. The heat zone 102 contains a torch 104 for heating pure water into steam. Refer to FIG. 1A for the relative positions of the reactor tube 101 and the heat zone 102. The torch 104 is coupled to the end of the heat zone 102. Refer to FIG. 1B for the structure of the torch 104. The torch 104 generates flame for heating the pure water which then evaporates and becomes steam. The steam is carried through the passage under the reactor tube 101 and out through filter 103 for wet oxidation.

The torch 104 is monoblock casting, as shown in FIG. 1B. The oxygen is introduced to the heating pipe 108 through oxygen inlet pipe 106 while the hydrogen through hydrogen inlet pipe 107. The hydrogen and oxygen mix at the mouth 109 of the hydrogen inlet pipe 107. Since the heating pipe 108 is encircled with electrical heating elements, the temperature inside the heating pipe 108 can reach 850° C. under PID (Proportional-Integral-Derivative) control. The hydrogen and oxygen combust under such high temperature and generate flame at the mouth 109 of the hydrogen inlet pipe 107.

Since the mouth 109 of the hydrogen inlet pipe 107 is continuously tempered during the process of wet oxidation, the mouth 109 will get brittle in 60 days and generate undesirable powder dusts. The powder dusts will follow the steam into the reactor tube 101 and then contaminate the wafers. Moreover, the shape of the mouth 109 will distort slightly due to continuously tempering. This will change the flow pattern of the steam because the flame cannot extend precisely to the other side of the combustion chamber. Consequently, the reactor tube 101 cannot produce wafers with smooth and even oxide layers.

Conventional solution to this problem is to replace the entire torch 104 every 60 days even though only the hydrogen inlet pipe 107 needs replacement. Each torch costs about $1500. Usually a Fab has dozens of torches. In the long run, the cost on the replacement of torches will be astonishing. This expenditure will not only increase the manufacture and maintenance fee but also the down time of the machine.

SUMMARY OF THE INVENTION

Accordingly, it is a technical advantage of this invention to provide a new torch having a detachable hydrogen inlet pipe which increases the lifetime of the combustion chamber and minimizes the frequency of the replacement of entire torch thereby to save the manufacture cost and maintenance fee.

Another object of the invention is to provide a simple coupling device for connecting the hydrogen inlet pipe and the heating pipe so that the two pipes can be separated easily thereby to make the maintenance more easily.

The attainment of the foregoing and related objects may be achieved through use of the novel torch having a detachable hydrogen inlet pipe herein disclosed. In accordance with this invention, the new detachable torch contains a combustion chamber, a heating pipe, an oxygen inlet pipe, a hydrogen inlet pipe and a coupling device. The combustion chamber provides the place for the reaction of oxygen and hydrogen. The combustion chamber is encircled with cooling water to prevent from overheating. The other end of the combustion chamber is connected to a heating pipe which is encircled with heating element. The heating pipe is coupled to the oxygen inlet pipe and the hydrogen inlet pipe for introducing oxygen and hydrogen respectively into the heating pipe. The hydrogen inlet pipe is in a shape of L. The longer arm of the hydrogen inlet pipe can be inserted into the heating pipe and then fastened tightly on the heating pipe with the coupling device. Under high temperature, the mixture of hydrogen and oxygen will combust and generate flame at the mouth of the hydrogen inlet pipe. The flame can extend from the mouth of the hydrogen inlet pipe to the other end of the combustion chamber for heating pure water into steam.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

To solve the problems described above, the invention modify the structure of the hydrogen inlet pipe and allow it be detachable from the heating pipe. The invention further includes a coupling device to make the installation and replacement of the hydrogen inlet pipe more easily. Thus, whenever the hydrogen inlet pipe needs replacement, we only need to replace the hydrogen inlet pipe instead of the entire torch.

Figure 1A:
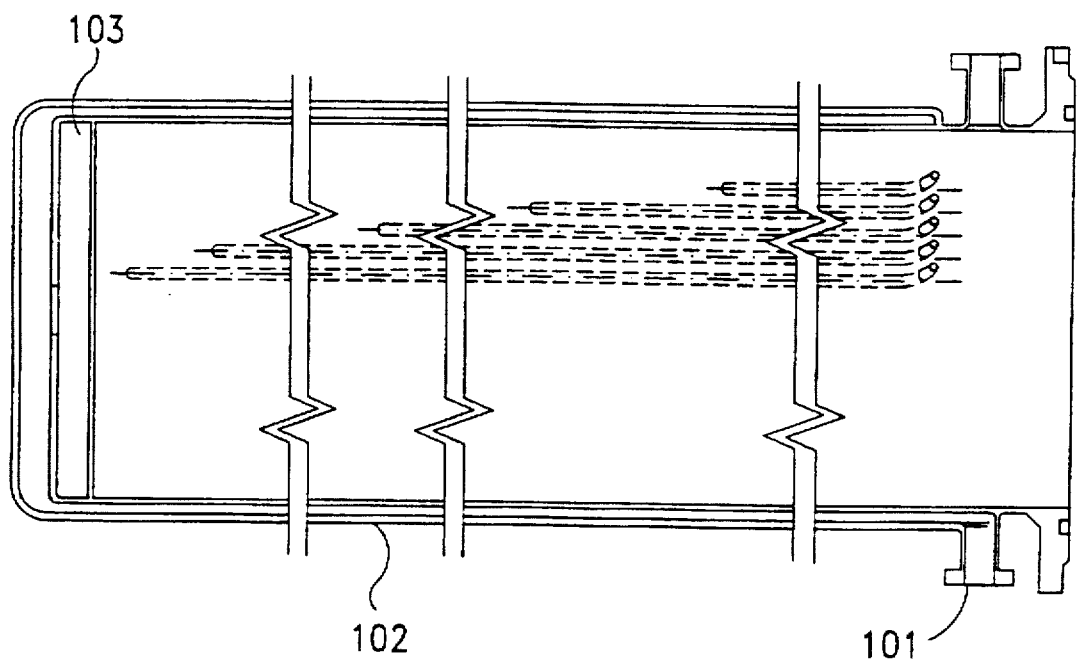
FIG. 1A is a sectional side view showing the structure of the conventional horizontal quartz tube for wet oxidation.
Figure 1B:
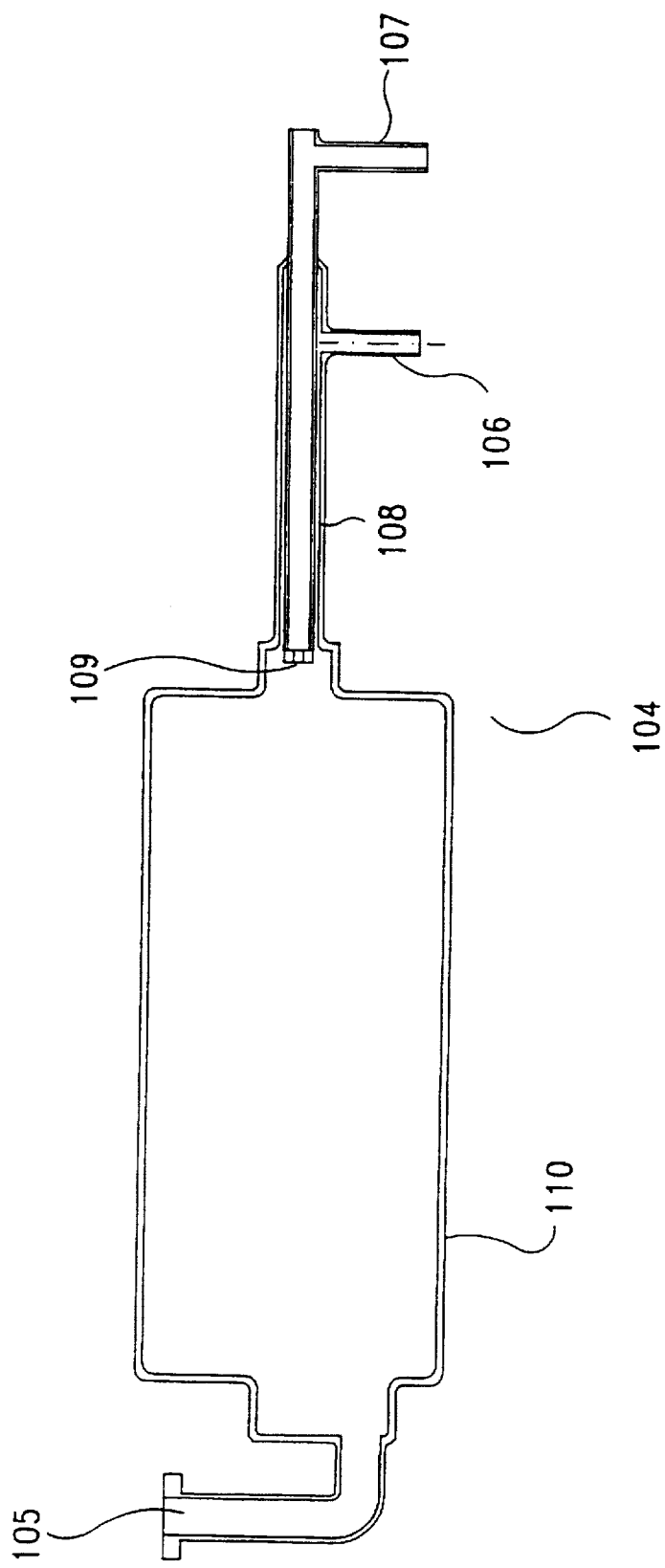
FIG. 1B is a sectional side view showing the conventional torch which is supposed to be coupled to the quartz tube as illustrated in FIG. 1A.
Figure 2:
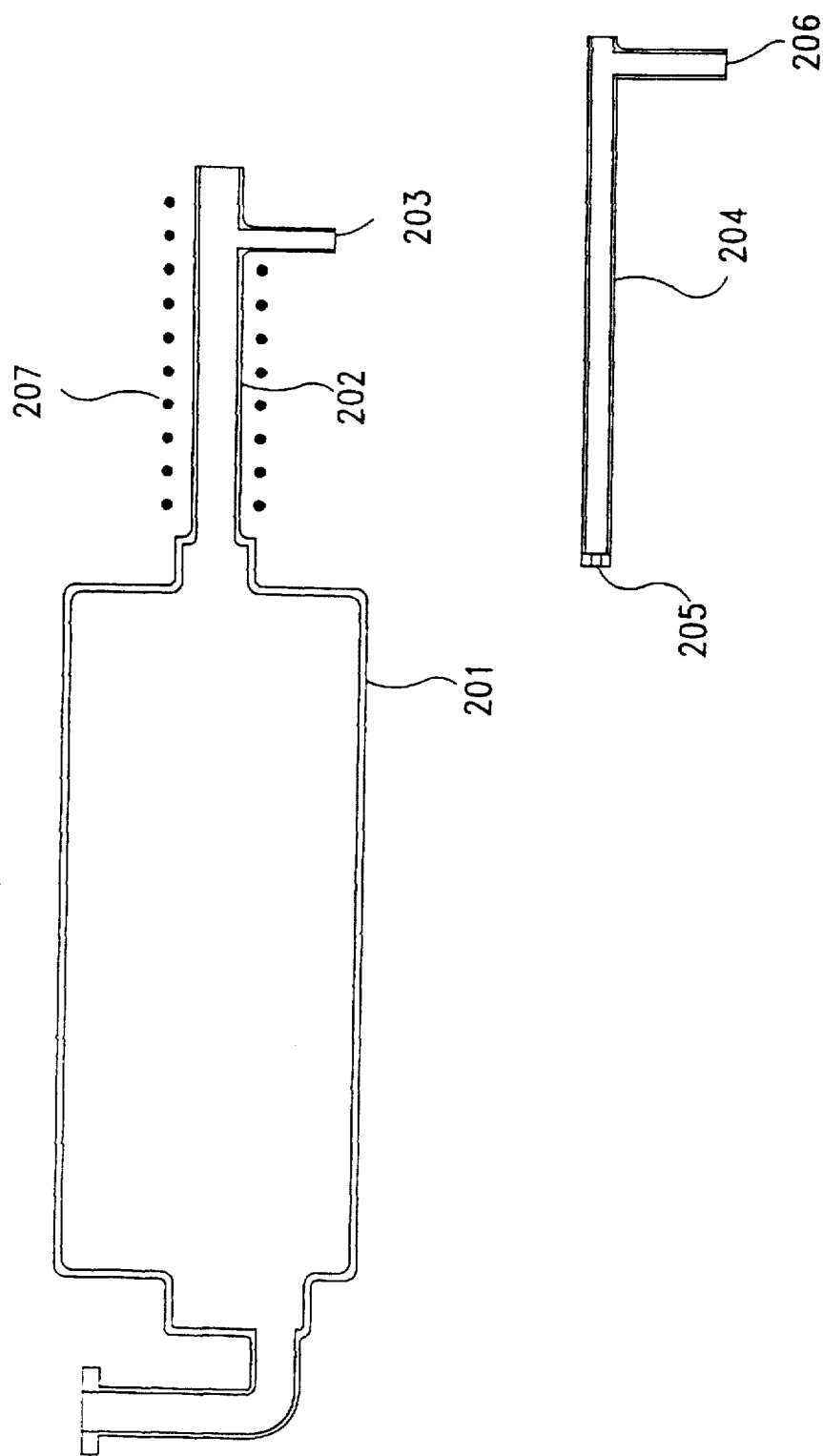
FIG. 2 is a sectional side view showing the elements of the detachable torch according to the preferred embodiment of the invention.
Figure 3:
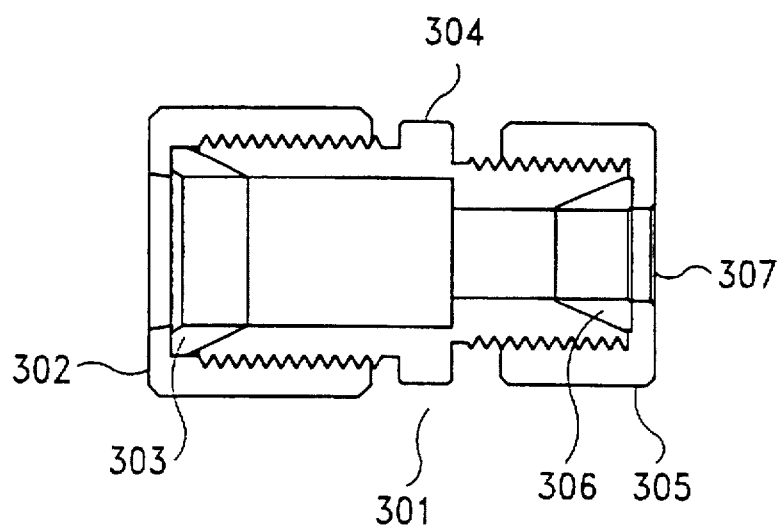
FIG. 3 is a sectional side view showing the coupling device for the detachable torch according to the preferred embodiment of the invention.

Refer to FIG. 2, the invention mainly includes a combustion chamber 201, a heating pipe 202, an oxygen inlet pipe 203, a hydrogen inlet pipe 204, and a coupling device (Refer to FIG. 3). Oxygen is introduced to the heating pipe 202 through the oxygen inlet pipe 203. The hydrogen inlet pipe 204 is in a shape of "L" whose shorter arm is for introducing hydrogen while its longer arm can be inserted into the heating pipe 202. When inserting into the heating pipe 202, its mouth 205 locates exactly at the junction between the heating pipe 202 and the combustion chamber 201. Oxygen and Hydrogen then mix together at the mouth 205 of the hydrogen inlet pipe 204. The heating pipe is encircled with heating elements 207. Under the control of PID, the temperature inside the heating pipe 202 can reach up to 850° C. Due to the high temperature, the mixture of hydrogen and oxygen react and generate flame at the mouth 205 of the hydrogen inlet pipe 204. The flame can extend to the other end of the combustion chamber 201 for heating the pure water. The combustion chamber 201 is encircled with cooling water for preventing the combustion chamber 201 from overheating. The combustion chamber 201, the heating pipe 202, the oxygen inlet pipe 203 and the hydrogen inlet pipe 204 are all made of quartz.

Figure 4:
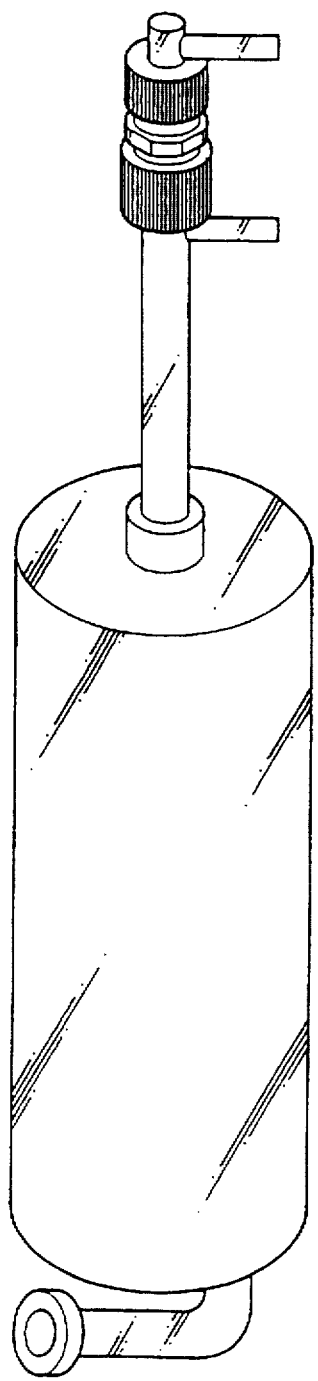
FIG. 4 is a sectional side view showing the outlook of the detachable torch according to the preferred embodiment of the invention.

The hydrogen inlet pipe 204 is coupled to the heating pipe 202 with a coupling device 301 as shown in FIG. 3. The coupling device 301 is made of refractory material such as TEFLON or stainless steel. The coupling device 301 includes a connecting sleeve bolt 302 and fitting shield 303, a connecting sleeve 304, a connecting sleeve bolt 305 and fitting shield 306. The hydrogen inlet pipe 204 (Refer to FIG. 2) is of a shape of L. When connecting to the heating pipe 202, its longer arm first inserts into the coupling device 301 from the opening 307 and then to the heating pipe 202 along with the coupling device 301. The coupling device 301 then fastens the heating pipe 202 and the hydrogen inlet pipe 204 together tightly. The length of the hydrogen inlet pipe 304 has been adjusted so that its mouth 205 will be right at the junction between the heating pipe 202 and the combustion chamber 201. FIG. 4 shows the picture of the entire torch according to the preferred embodiment of the present invention.

A preferred embodiment has been described in detail hereinabove. It is to be understand that the scope of the invention also comprehends embodiments different from the one described, yet within the scope of the claims. For example, the coupling device could be made of other comparable material, as long as it is refractory. Also, the coupling device could be of shapes other than cylindrical, such as rectangular, so long as it fastens the hydrogen inlet pipe and the heating pipe tightly.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A detachable torch coupling to a horizontal quartz tube for wet oxidation comprising:

a combustion chamber having one end connecting to said horizontal quartz tube and the other end connecting to a heating pipe;

said heating pipe encircled with heating elements for temperature control;

an oxygen inlet pipe connected to said heating pipe for introducing oxygen;

a hydrogen inlet pipe in a shape of "L" whose longer arm can be inserted into said heating pipe for introducing hydrogen;

coupling means made of refractory material for removably coupling said hydrogen inlet pipe to said heating pipe; and removing said coupling means permits separating said heating pipe from said hydrogen inlet pipe.

2. The apparatus as claimed in claim 1, wherein said coupling means comprises:

first connecting sleeve bolt, for fastening to said hydrogen inlet pipe;

second connecting sleeve bolt, for fastening to said heating pipe; and a connecting sleeve, for coupling said first connector and said second connector.

3. The apparatus as claimed in claim 1, wherein said coupling means is made of TEFLON or stainless steel.

4. The apparatus as claimed in claim 1, wherein said combustion chamber is encircled with cooling water.

5. The apparatus as claimed in claim 1, wherein said combustion chamber, said heating pipe, said oxygen inlet pipe, and said hydrogen inlet pipe are all made of quartz.

6. A detachable torch for wet oxidation comprising:

a combustion chamber having first and second ends, said first end adapted for connection to a quartz tube;

a heating pipe encircled by at least one heating element, said heating pipe having first and second ends, said heating pipe first end connected to the second end of the combustion chamber;

an oxygen inlet pipe connected to said heating pipe for introducing oxygen;

a hydrogen inlet pipe having a first end insertable into said heating pipe second end, and a length sufficient for said hydrogen inlet pipe first end to be positioned at a junction between the heating pipe and the combustion chamber, when the hydrogen inlet pipe is inserted into the heating pipe; and a coupling member formed from a refractory material and adapted to secure said hydrogen inlet pipe to said heating pipe.

7. The torch of claim 6, wherein the hydrogen inlet pipe is L-shaped with a long arm insertable into the heating pipe, and a short arm for introducing hydrogen.

8. The torch of claim 6, wherein the combustion chamber, the heating pipe, the oxygen inlet pipe, and the hydrogen inlet pipe are all made of quartz.

9. The torch of claim 6, wherein the coupling member is formed from one of the group consisting of teflon and stainless steel.

10. The torch of claim 6, wherein the coupling member comprises:

a first connecting sleeve bolt adapted to connect to the hydrogen inlet pipe;

a second connecting sleeve bolt adapted to connect to the heating pipe; and a connecting sleeve adapted to couple the first and second connecting sleeves to each other.

* * * * *